United States Patent [19]

Colibert

[11] Patent Number: 5,240,270

[45] Date of Patent: Aug. 31, 1993

[54] FIFTH-WHEEL EXTENSION ADAPTER

[76] Inventor: Floyd A. Colibert, 2995 W. 6620 South, West Jordan, Utah 84084

[21] Appl. No.: 798,611

[22] Filed: Nov. 26, 1991

[51] Int. Cl.$^5$ .............................................. B60D 1/07
[52] U.S. Cl. ............................. 280/417.1; 280/418.1;
280/423.1; 280/496; 280/504; 280/511
[58] Field of Search .................... 280/496, 417.1, 416.1,
280/441.2, 512, 901, 186, 418.1, 423.1, 504, 511, 433

[56] References Cited

U.S. PATENT DOCUMENTS

| | | | |
|---|---|---|---|
| 2,475,878 | 7/1949 | Clark et al. | 280/512 |
| 3,164,399 | 1/1965 | Lugash | 280/416.1 X |
| 3,390,896 | 7/1968 | Philapy | 280/901 X |
| 3,527,476 | 9/1970 | Winckler | 280/441.2 X |
| 3,788,673 | 1/1974 | Gloege | 280/901 X |
| 4,266,797 | 5/1981 | Rhodes | 280/901 X |
| 4,320,907 | 3/1982 | Eaton | 280/901 X |
| 4,832,358 | 5/1989 | Bull | 280/441.2 X |
| 5,058,915 | 10/1991 | Burns | 280/441.2 |

Primary Examiner—David M. Mitchell
Assistant Examiner—Peter C. English
Attorney, Agent, or Firm—Thorpe, North & Western

[57] ABSTRACT

A fifth-wheel extension adapter is provided for coupling a fifth-wheel trailer to a ball hitch assembly which is mounted in the bed of a truck. The fifth-wheel extension adapter comprises generally an extension frame, a ball coupler assembly for releasably and rotatably connecting the extension frame to the ball hitch assembly through a horizontal insertion, the ball coupler assembly being integrally attached to the bottom end of the extension frame, and a fifth-wheel trailer attachment assembly for connecting the extension frame to the fifth-wheel trailer, the fifth-wheel trailer attachment assembly being integrally attached to the top end of the extension frame.

18 Claims, 5 Drawing Sheets

FIFTH-WHEEL EXTENSION ADAPTER

BACKGROUND OF THE INVENTION

1. Field:

This invention relates generally to the coupling of trailers to lead vehicles and more specifically to a novel extension device for aiding in the temporary attachment of a fifth-wheel trailer to a ball hitch which is securely attached at floor level in the bed of a pick-up truck or other similar lead vehicle.

2. Prior Art:

A fifth-wheel trailer is generally a large, high profile trailer which is coupled to the lead vehicle, usually a pick-up truck, by a fifth-wheel connector assembly which is mounted on a frame within the bed of the truck such that the fifth-wheel connector is disposed in a plane well above that of the bed of the truck. While effectively coupling the fifth-wheel trailer to the pick-up truck, such an assembly can be problematic when the pick-up truck is desired for other uses. For example, when the bed of the pick-up truck is required for cargo loading, either the cargo must be placed about and around the connector assembly and frame or else the assembly must be removed from the bed of the pick-up truck.

Neither of these is desirable since the connector assembly and frame usually take up a substantial amount of space and removal of the assembly and frame from the bed of the pick-up truck requires an inordinate amount of time and effort.

Applicant is unaware of any prior art apparatus or device by which a conventional fifth-wheel trailer can be coupled to a standard ball hitch assembly mounted in the bed of a pick-up truck. Therefore, there exists in the art a legitimate need for a fifth-wheel extension adapter which couples a fifth-wheel trailer to a standard ball hitch assembly which is mounted in the bed of a pick-up truck, alleviating the need for a voluminous and cumbersome mounting frame.

BRIEF SUMMARY AND OBJECTS OF THE INVENTION

Accordingly, it is a principal object of the present invention to provide a fifth-wheel extension adapter for coupling a fifth-wheel trailer to a ball hitch assembly which is mounted in the bed of a pick-up truck, the extension adapter being removable both from the fifth-wheel trailer and from the ball hitch assembly mounted in the bed of the truck.

It is a further object of the invention to provide a fifth-wheel extension adapter which may be installed and removed facilely and efficiently.

It is still another major object of the invention to provide a fifth-wheel extension adapter which temporarily attaches at one end to a standard ball hitch assembly in the bed of a pick-up truck and which temporarily attaches at the opposite end to the fifth-wheel trailer.

A further important object of the invention is to provide a fifth-wheel extension adapter which is easy to manufacture, relatively inexpensive to purchase, easy to install, efficient, durable, and long lasting.

These and other objects and features are found in the preferred embodiment of the present invention which comprises generally a curved extension frame constructed of a structural material such as steel and including first and second coupling means. The first coupling means releasably connects the extension frame to a standard ball hitch assembly which is mounted in the bed of a pick-up truck, the first coupling means being integrally attached to the bottom end of the extension frame.

The second coupling means is for releasably connecting the extension frame to a fifth-wheel trailer, the second coupling means being integrally attached at the top end of the extension frame.

The preferred first coupling means advantageously comprises a set of jaws which are openable so as to receive a standard ball type hitch and closable about said ball type hitch, and a hinged cap which may be moved into a position over the closed jaws to maintain the jaws in a closed position, thereby assuring that the ball hitch remains enclosed within the jaws. Other coupling means could be substituted therefor, which means would fall within the purview of this invention.

The second coupling means preferably comprises a relatively flat plate integrally attached, as by welding, to the extension frame. The plate includes integrated brackets and corresponding screws, each disposed at opposing sides of the plate. These screws may be adjusted manually to properly position and square the fifth-wheel trailer.

The plate also includes a plurality of flaps which are formed in the plate by making a U-shaped cut therein. The free end of each flap may be raised slightly by manually rotating gap-adjustment screws. These flaps serve to position the fifth-wheel trailer such that no vertical movement is allowed between the plate and the fifth-wheel trailer.

Finally, the plate includes a bracket and screw located near the front end thereof, the purpose thereof being to lock the fifth-wheel trailer into position. A U-shaped locking member is disposed just under the plate for the same purpose.

Advantageously, the jaws and cap of the first coupling means may be operated from a position remote from the bed of the truck so as to not require the operator to climb into the bed of the truck when attaching or detaching the fifth-wheel extension adapter to or from the pick-up truck.

BRIEF DESCRIPTION OF THE DRAWINGS

In order that the manner in which the above recited and other advantages and objects of the invention are obtained can be appreciated, a more particular description of the invention briefly described above will be rendered by reference to a specific embodiment thereof which is illustrated in the appended drawing. Understanding that these drawings depict only a typical embodiment of the invention and are not therefore to be considered limiting of scope, the invention will be described and explained with additional detail through the use of the accompanying drawings in which.

DETAILED DESCRIPTION OF THE PREFERRED EMBODIMENTS

Figure 1:
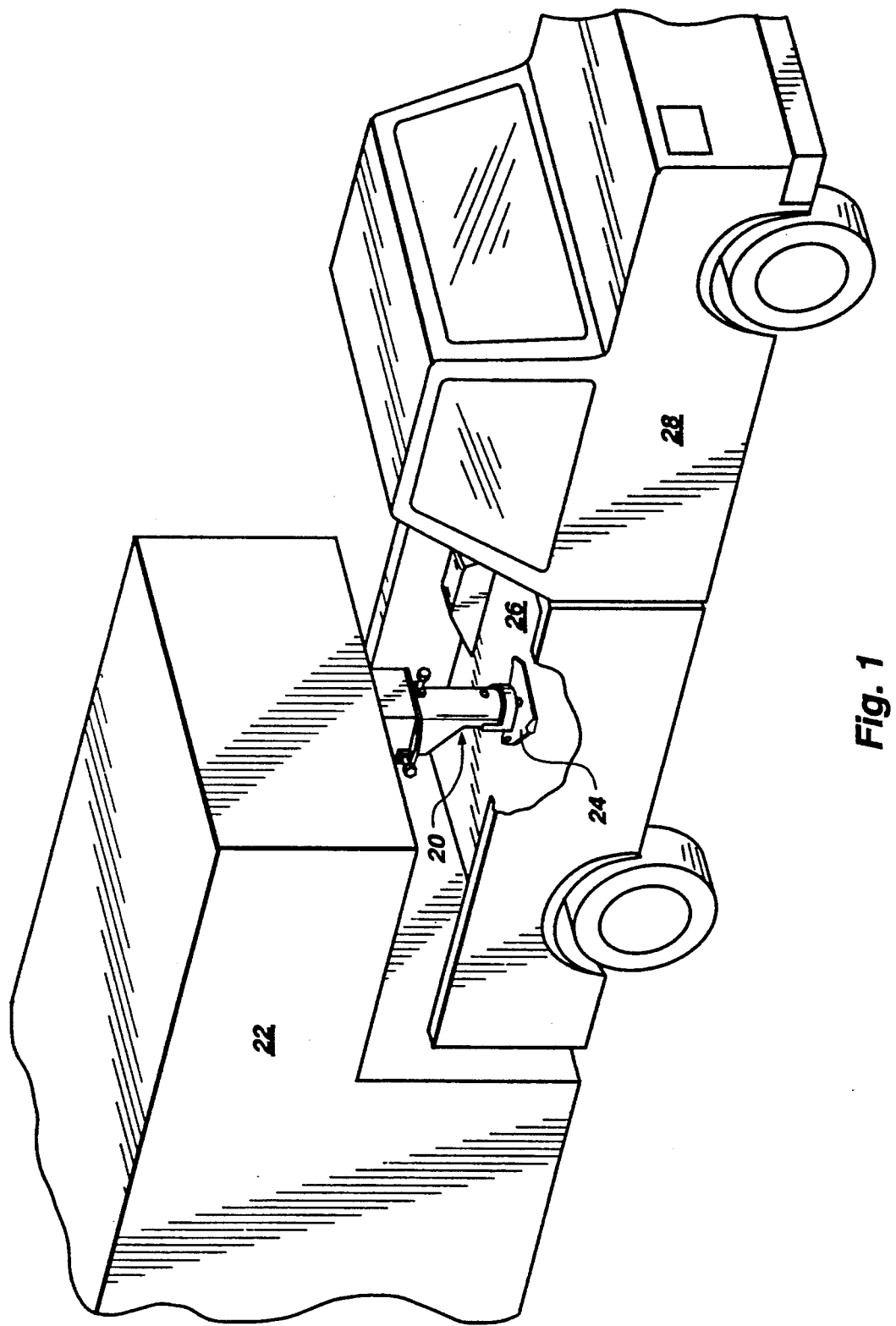
FIG. 1 is a partial perspective view of an example of a fifth-wheel extension adapter according to the invention used with a conventional fifth-wheel trailer and pick-up truck.
Figure 2:
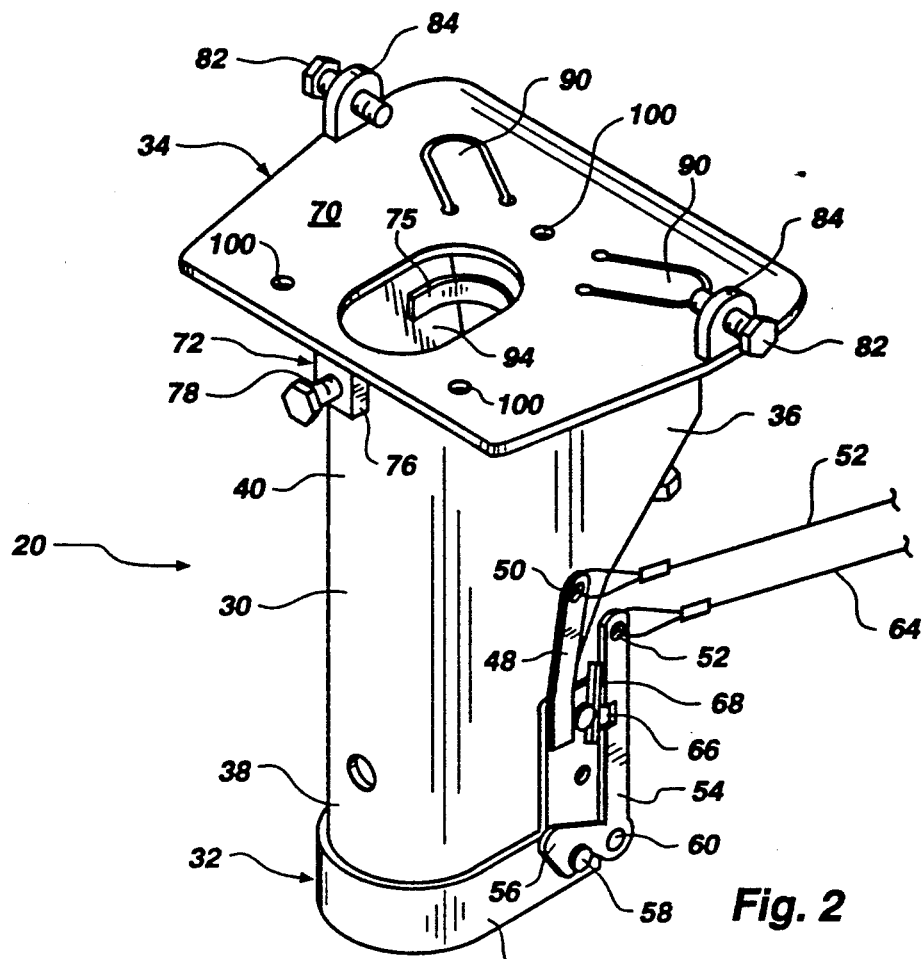
FIG. 2 is a perspective view of the extension adapter of FIG. 1.
Figure 3:
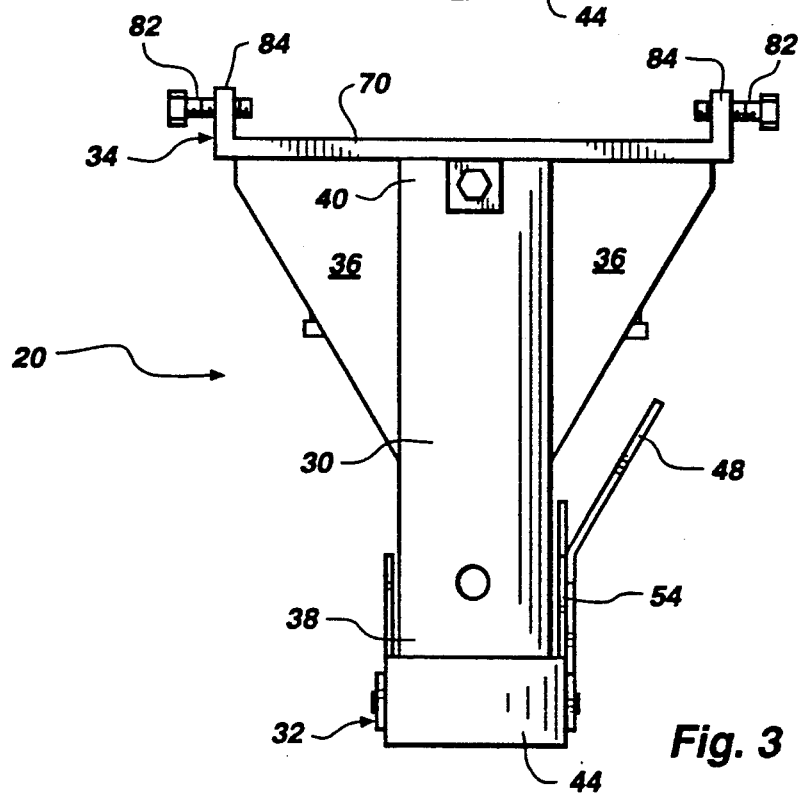
FIG. 3 is a front elevational view of the extension adapter of FIG. 1.

Reference will now be made to the drawing wherein like structures will be provided with like reference designations. Referring first to FIGS. 1 to 7 and 9, a preferred fifth-wheel extension adapter 20 for coupling a fifth-wheel trailer 22 to a ball hitch assembly 24 which is mounted in the bed 26 of a standard pick-up truck 28 is illustrated. The fifth-wheel extension adapter 20 comprises generally an extension frame 30, a ball coupler assembly 32 for releasably and rotatably (after connection) connecting the extension frame 30 to the ball hitch assembly 24, and a fifth-wheel trailer attachment assembly 34 for connecting the extension frame 30 to the fifth-wheel trailer 22. These and other component parts will be described in greater detail hereafter.

The extension frame 30 provides extended structural support between the fifth-wheel trailer 22 and the ball hitch assembly 24. The extension frame 30 is preferably made of a structural plate steel which has been bent into a columnar shape or a shape which is somewhat similar thereto. Advantageously, the shape includes integrated flared gussets or wings 36 which strengthen the adapter 20 and facilitate its attachment to the fifth-wheel trailer 22 as explained hereafter. As shown, the extension frame 30 includes a bottom end 38 and a top end 40 where the ball coupler assembly 32 and the fifth-wheel trailer attachment assembly 34, respectively, are integrally attached.

The ball coupler assembly 32 is standard in the industry except as modified as explained hereafter. The AUTOLOCK coupler manufactured by Trailer Equipment Manufacturing of Menden, La., is suitable for use in the invention. The ball coupler assembly 32 attached at the bottom end 38 of the extension frame 30 comprises generally a set of jaws 42 (FIG. 7) being moveable between an open position whereby a standard ball type hitch may be inserted therein and a closed position whereby the ball type hitch is securely held therein, and a hinged cap 44 which can be drawn over the set of jaws 42 when the set of jaws are closed to ensure that the ball type hitch remains rotatably secured therein.

Figure 4:
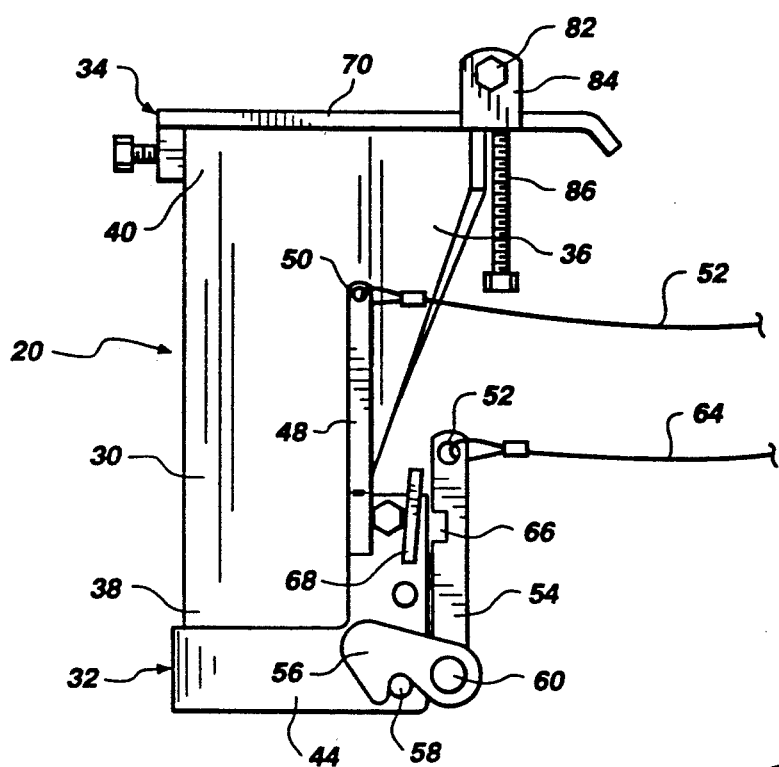
FIG. 4 is a side elevational view of the extension adapter of FIG. 1 with a cap being drawn over the closed ball hitch engaging jaws.
Figure 5:
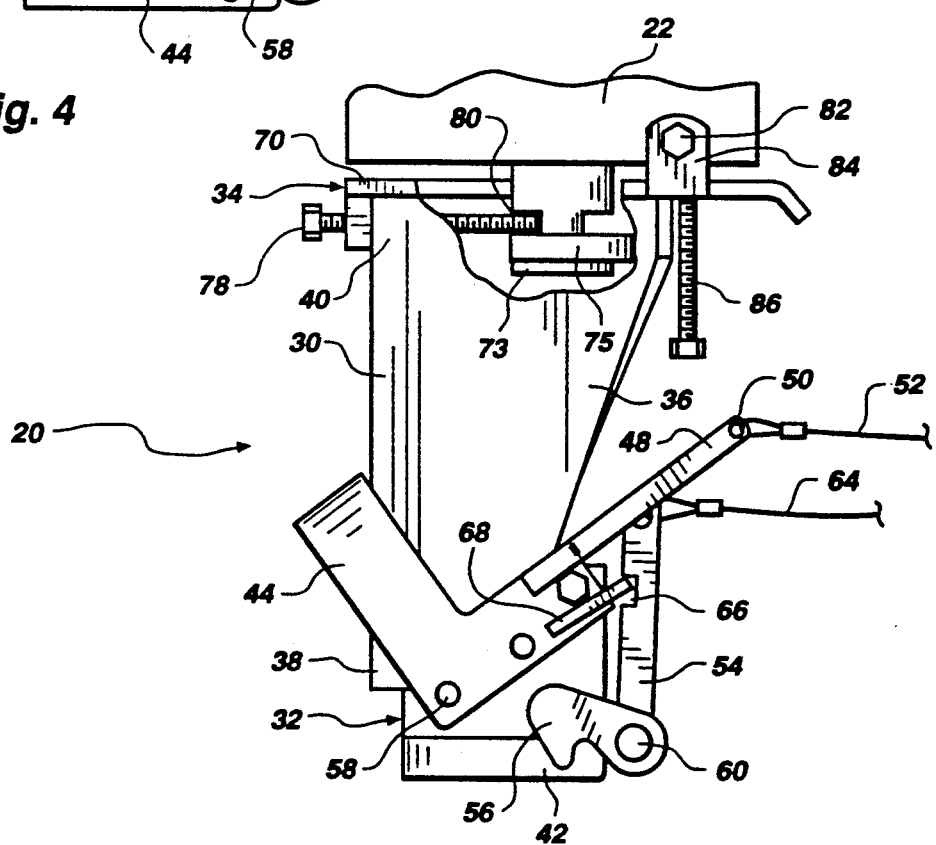
FIG. 5 is a side elevational view of the extension adapter of FIG. 1 with a partial view of the attached fifth-wheel trailer, showing the cap in an open jaw releasing position.
Figure 6:
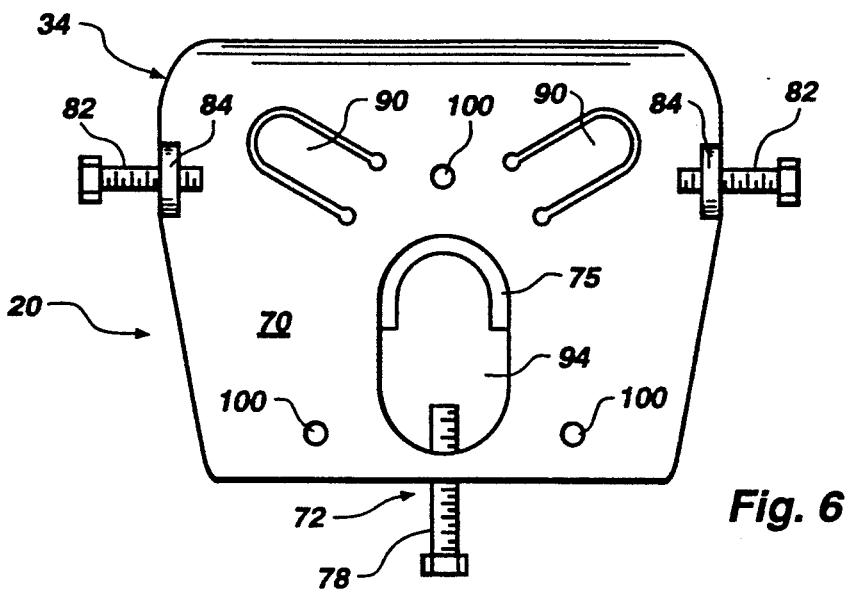
FIG. 6 is a top plan view of the extension adapter of FIG. 1.
Figure 7:
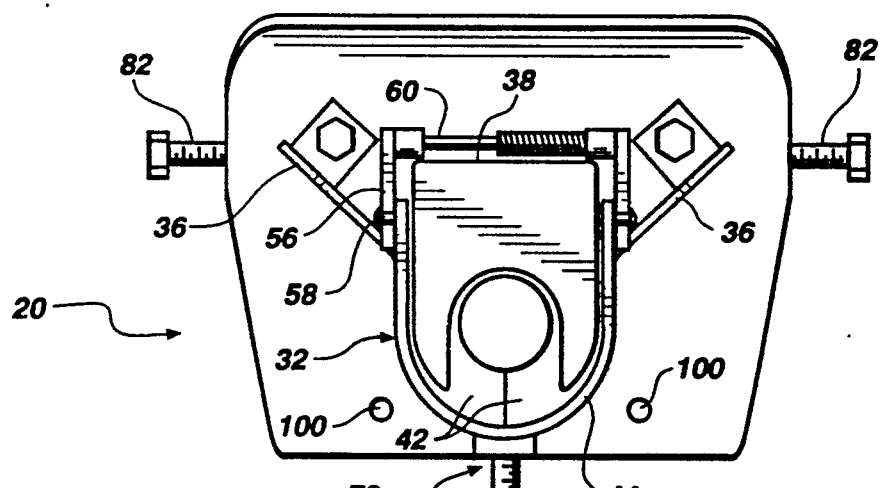
FIG. 7 is a bottom plan view of the extension adapter of FIG. 1.

Advantageously, the ball coupler assembly 32 is moveable between the open position and the closed position from an operating location which is remote from the location thereof. The best mode presently contemplated for facilitating remote operation of the ball hitch attachment assembly 32 is best seen in FIGS. 4 and 5. Therein as illustrated a first lever 48 is attached at one end to the hinged cap 44, the opposite end including a aperture 50 through which a looped connecter line 52 is securely attached. The looped connector line 52 leads to the remote operating location. As the hinged cap 44 is biased in the closed position (FIG. 4), an operator in a remote operating location pulls on the connector line 52 and the hinged cap 44 is raised to the open position (FIG. 5).

Prevention of raising the hinged cap 44 from the closed position to the open position may be facilitated by a second lever 54 in conjunction with a locking hook 56. In the closed position, a locking hook 56, as shown in FIG. 4, is hooked about an outwardly extending peg 58, which is integrally attached to the hinged cap 44. The second lever 54 and corresponding locking hook 56 are biased downwardly in the locked position. Thus, in the closed position, the hinged cap 44 surrounds the closed set of jaws 42 which encompass the ball hitch assembly 24 disposed in the bed 26 of the truck 28. Because the hinged cap 44 is locked in place, little or no chance exists that the jaws 42 will release prematurely when pulling a fifth-wheel trailer 22.

As illustrated, the second lever 54 is rigidly attached at one end to the locking hook 56, the second lever 54 and locking hook 56 being rotatably mounted on a shaft or axle 60 which is securely attached to the extension frame 30. The opposite end of the second lever 54, similar to the first lever 48, includes an aperture 52 through which a looped connector line 64 is securely attached. The looped connector line 64 leads to the remote operating location mentioned above in connection with the looped connecter line 52. The second lever 54 includes a notch 66, which is located at the approximate middle point between the two ends of the second lever 54. Further, a tab 68 is welded or otherwise securely attached to the hinged cap 44 such that when the looped connector line 64 is pulled by an operator at the remote operating location, and the hinged cap is raised to the open position responsive to the operator pulling on the looped connector line 52, the tab 68 engages the notch 66 to prevent the hinged cap 44 from closing. When the hinged cap 44 is to be closed, after the ball hitch assembly 24 is placed within the jaws 42, a slight pull on the looped connector line 64 disengages the tab 68 from the notch 66, thus allowing the hinged cap 44 to move to the closed position when the jaws 42 are closed. When the jaws 42 are open, the cap 44 rests upon them after disengagement of the tab 68 from the notch 66. The cap automatically moves to the closed position upon closure of the jaws 42. One skilled in the art will recognize that the provision of the first and second levers 48 and 54 respectively, and the looped connector line 52 and 64 gives an operator the advantage of moving the hinged cap 44 between the opened and closed positions without having to climb into the bed 26 of the truck 28.

As mentioned above, the trailer attachment assembly 34 is integrally attached to the top end 40 of the extension frame 30. The preferred fifth-wheel trailer attachment assembly 34 comprises generally a horizontally disposed plate 70, the horizontally disposed plate 70 including a securing assembly 72 to secure the extension frame 30 to the fifth-wheel trailer pin 73, and an assembly described below for removing play between the fifth-wheel trailer pin 73 and the horizontally disposed plate 70. Preferably the securing assembly 72 comprises a bracket 76 which is integrally attached to the horizontally disposed plate 70 and through which a screw 78 passes, the screw 78 being manually adjustable to maintain the fifth-wheel trailer pin 73 in a secure position. As shown most clearly in FIG. 5, the screw 78 is manually advanced into a channel 80 on the fifth-wheel trailer pin 73 such that the fifth-wheel trailer 22 is secured to the fifth-wheel extension adapter 20.

A U-shaped locking member 75 is welded or otherwise secured to the inside of the extension frame 30 just below the plate 70, and is adapted to secure the fifth-wheel trailer pin 73 in conjunction with the screw 78. In the preferred embodiment, the pin 73 is advanced toward the locking member 75 such that the lower part of the channel 80 engages the locking member 75. The screw 78 is then advanced into the upper part of the channel 80 until the pin 73 is secured between the screw 78 and the locking member 75 both horizontally and vertically.

Advantageously, the assembly for removing play between the fifth-wheel trailer pin 73 and the horizontally disposed plate 70 comprises a first pair of manually adjustable set screws 82 which are threaded through brackets 84 which are attached, preferably integrally, to the horizontally disposed plate 70. The first pair of set screws 82 are preferably disposed in a plane parallel to the horizontal plane defined by the horizontally disposed plate 70 so as to square the extension adapter 20 to the trailer 22 and prevent rotation therebetween.

Figure 8:
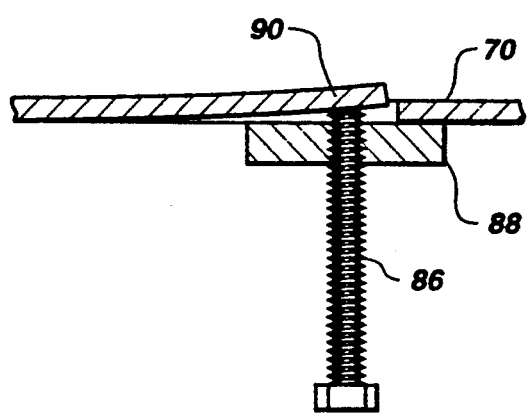
FIG. 8 is a partial cross-sectional view of the extension adapter of FIG. 1 illustrating in detail an adjustable flap for removing vertical play between the fifth-wheel trailer and the extension adapter.
Figure 9:
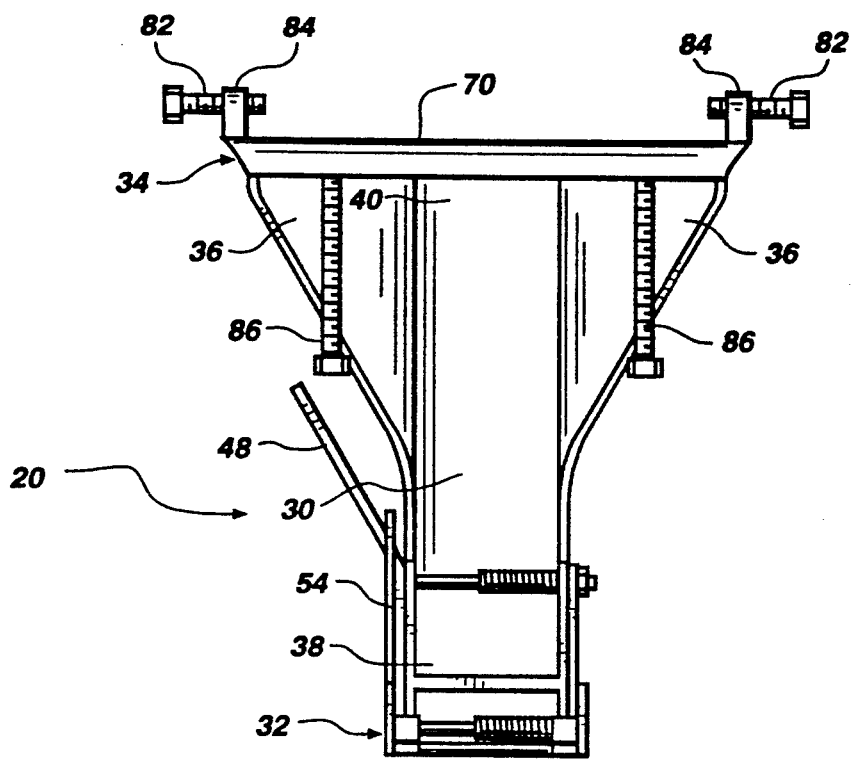
FIG. 9 is a rear elevational view of the extension adapter of FIG. 1.

The assembly for removing play between the fifth-wheel trailer 22 and the horizontally disposed plate 70 further comprises a second pair of manually adjustable set screws 86 threaded through corresponding brackets (FIG. 8) which are securely attached, preferably integrally, to the horizontally disposed plate 70. The second pair of set screws 86 are preferably disposed in a plane perpendicular to the plane defined by the horizontally disposed plate 70. As shown most clearly in FIG. 8, each screw 86 contacts and, upon advancement, influences a tab 90 which has been cut in the horizontally disposed plate 70 so as to remove vertical play between the fifth-wheel trailer 22 and the extension frame 30.

Therefore, when attaching the extension frame 30 to the fifth-wheel trailer 22 the pin 73 of the fifth-wheel trailer 22 (FIG. 5), which includes the channel 80, is inserted through an aperture 94 in the plate 70. The pin 73 is then moved until the lower part of the channel 80 engages the locking member 75. The screw 78 of the securing assembly 72 is then manually advanced such that the free end thereof extends into the upper portion of the channel 80 of the pin 73. The fifth-wheel trailer 22 is thereby secured to the fifth-wheel extension adapter 20 in sliplock fashion. In order to square the trailer 22 and remove play both horizontally and vertically, the screws 82 are both manually advanced until the ends thereof contact the fifth-wheel trailer. Similarly the vertically disposed set screws 86 are advanced against the tabs 90, thereby forcing the tabs 90 upwardly out of the plane formed by the horizontal plate 70.

Figure 10:
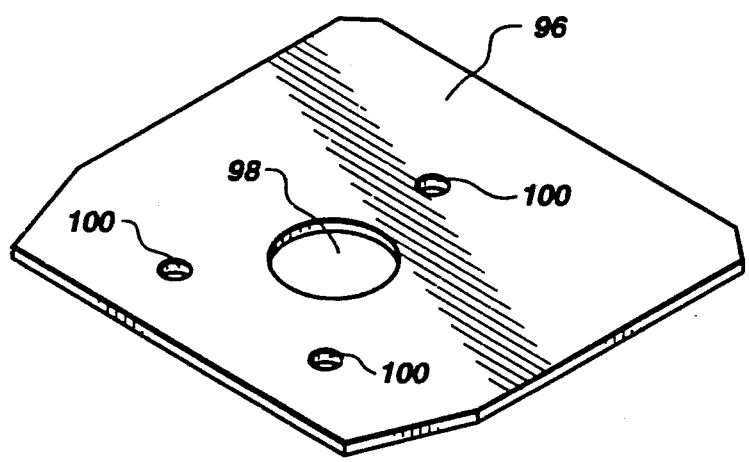
FIG. 10 is a perspective view of a spacer plate according to the invention which may be used to remove additional play between the fifth-wheel trailer and the extension adapter.

In the event that the tabs 90 cannot be advanced far enough to remove all play between the fifth-wheel trailer 22 and the extension frame 30, a shim plate 96 may be placed therebetween. As shown in FIG. 10, the shim plate 96 includes an aperture 98 which aligns generally with the aperture 94 to allow insertion of the nose piece 92 of the fifth-wheel trailer 22. With the addition of the shim plate 96 laid over the top of the horizontal plate 70, all vertical play is effectively removed from between the fifth-wheel trailer and the extension frame 30.

A plurality of holes 100 are provided in the plate 70 to accommodate screws (not shown) which further secure the adapter 20 to the trailer 22. The holes 100 are preferably disposed one to each side of and one behind the aperture 94, but may be located in any suitable configuration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A fifth-wheel extension adapter for coupling between a trailer pin of a fifth wheel trailer and a hitch assembly which is mounted in the bed of a truck, comprising
a substantially columnar extension frame having bottom and top ends,
first coupling means for rotatably and releasably connecting the extension frame to the hitch assembly, the first coupling means being integrally attached to the bottom end of the extension frame, and
second coupling means for releasably connecting the extension frame to the fifth wheel trailer, the second coupling means being integrally attached to the top end of the extension frame and including releasable securing means for attachment of the second coupling means at the trailer pin of the fifth wheel trailer.

2. A fifth-wheel extension adapter according to claim 1 wherein the first coupling means comprises a ball coupler assembly being movable between an open position wherein a ball-type hitch may be inserted therein and a closed position wherein the ball-type hitch is securely held therein.

3. A fifth-wheel extension adapter according to claim 2 wherein the ball coupler assembly comprises a set of jaws which are openable to allow insertion of the ball-type hitch therein and closable to prevent removal of the ball-type hitch, and a hinged cap which can be drawn over the set of jaws When the set of jaws are closed to insure that the ball-type hitch remains rotatably secured therein.

4. A fifth-wheel extension adapter according to claim 2 wherein the ball coupler assembly is movable between the open position and the closed position from an operating location which is remote from the location thereof.

5. A fifth-wheel extension adapter according to claim 4 wherein the ball coupler assembly is movable from the remote operating location by a series of levers attached to the ball coupler assembly, and cables which are attached at one end thereof to the levers, the other end thereof being disposed near the remote operating location.

6. A fifth-wheel extension adapter according to claim 1 wherein the second coupling means comprises a horizontally disposed plate, said horizontally disposed plate including the releasable securing means to releasably secure the extension frame to the fifth-wheel trailer, and means for removing play between the fifth-wheel trailer and the horizontally disposed plate.

7. A fifth-wheel extension adapter according to claim 6 further comprising a pin, having a channel laterally disposed therein, extending from the fifth-wheel trailer into an aperture in the horizontally disposed plate, and wherein the securing means comprises a U-shaped locking member disposed beneath the horizontally disposed plate toward which the pin is moved until the channel engages the locking member, and a screw mounted on the horizontally disposed plate, said screw being extendable into the channel to secure the pin between the screw and the locking member.

8. A fifth-wheel extension adapter according to claim 6 wherein the means for removing play between the fifth-wheel trailer and the horizontally disposed plate comprises a first pair of manually adjustable set screws threaded through brackets attached to the horizontally disposed plate, said first pair of set screws disposed in a plane parallel to the plane defined by the horizontally disposed plate so as to remove side-to-side play between the fifth-wheel trailer and the extension frame, and a second pair of manually adjustable set screws threaded through brackets attached to the horizontally disposed plate, said second pair of set screws disposed in a plane perpendicular to the plane defined by the horizontally disposed plate, and each of the second pair of set screws contacting and influencing a tab in the horizontally disposed plate so as to remove vertical play between the fifth-wheel trailer and the extension frame.

9. An apparatus for coupling a fifth-wheel trailer to a hitch assembly disposed in the bed of a truck comprising:
   an elongate extension frame substantially vertically oriented;
   a coupling device for coupling the extension frame to the hitch assembly disposed on the lower end of the extension frame;
   a releasable attachment device disposed on the upper end of the extension frame for securely but releasably attaching the extension frame to the fifth-wheel trailer, said releasable attachment device including releasable securing means configured to couple with a trailer pin of the fifth-wheel trailer.

10. The apparatus of claim 9 wherein the attachment device comprises a substantially horizontal plate mounted at the top of the extension frame having an aperture disposed therein, and wherein a pin is disposed on the fifth-wheel trailer, the pin being adapted for insertion into the aperture, means being provided to secure the pin into the aperture.

11. The apparatus of claim 10 further comprising a channel disposed in the pin and wherein the means for securing the pin comprises a locking member mounted to the extension frame beneath the horizontal plate, the pin being adapted for movement toward the locking member, and means for pressing the pin against the locking member such that the locking member securely engages the channel.

12. The apparatus of claim 9 wherein the attachment device comprises substantially horizontal tabs adapted to be bent upwardly to press against the fifth-wheel trailer to remove vertical play between the trailer and the attachment device.

13. The apparatus of claim 9 wherein the attachment device comprises horizontal set screws mounted on the attachment device adapted to press against the fifth-wheel trailer and square it relative to the apparatus.

14. The apparatus of claim 9 wherein the extension frame comprises a substantially columnar housing with gussets extending therefrom for strength.

15. The apparatus of claim 9 further comprising means for remotely controlling the coupling device.

16. An apparatus for adapting a fifth-wheel trailer, having a conventional channelled pin extending therefrom the channel having an upper and a lower portion, for rotatable attachment to a ball hitch in the bed of a truck comprising:
   an extension frame having an upper and lower portion comprising a plate bent into substantially columnar shape with gussets extending from the upper portion thereof;
   a coupler securely attached to the lower portion of the extension frame comprising a pair of jaws adapted to be selectively opened and closed around the ball hitch, a cap adapted for selective placement over the jaws to secure them in the closed position, a first lever attached to the cap by which said cap is moved over and off of the jaws, a lock for locking the cap into position over the jaws, and a second lever attached to the lock by which the lock is locked and released;
   a substantially horizontal plate mounted on the upper portion of the extension frame;
   a first aperture disposed in the horizontal plate for reception of the pin;
   a U-shaped locking member secured to the extension frame beneath the horizontal plate for engaging the lower portion of the channel;
   a rod mounted to the apparatus approximately opposite the locking member for engaging the upper portion of the channel, the pin thus being secured both horizontally and vertically between the locking member and the rod;
   means for squaring the fifth-wheel trailer to the apparatus;
   a tab cut out of the horizontal plate and a screw mounted beneath the tab for urging the tab upwardly against the fifth-wheel trailer for removal of play between the fifth-wheel trailer and the horizontal plate.

17. The apparatus of claim 16 further comprising a second aperture in the horizontal plate to accommodate a screw threaded through the plate and the fifth-wheel trailer.

18. The apparatus of claim 16 further comprising a spacer plate having a third aperture corresponding to the first aperture, adapted for placement between the horizontal plate and the fifth-wheel trailer for removal of vertical play therebetween.

* * * * *